(12) United States Patent
Dupenloup

(10) Patent No.: US 7,506,017 B1
(45) Date of Patent: Mar. 17, 2009

(54) VERIFIABLE MULTIMODE MULTIPLIERS

(75) Inventor: Guy Dupenloup, Redwood City, CA (US)

(73) Assignee: Altera Corporation, San Jose, CA (US)

( * ) Notice: Subject to any disclaimer, the term of this patent is extended or adjusted under 35 U.S.C. 154(b) by 750 days.

(21) Appl. No.: 10/853,427

(22) Filed: May 25, 2004

(51) Int. Cl.
*G06F 7/52* (2006.01)

(52) U.S. Cl. ...................... 708/620; 708/625

(58) Field of Classification Search ............... 708/620, 708/625
See application file for complete search history.

(56) References Cited

U.S. PATENT DOCUMENTS

| | | | | |
|---|---|---|---|---|
| 3,814,924 A | * | 6/1974 | Tate | 708/625 |
| 4,752,905 A | * | 6/1988 | Nakagawa et al. | 708/629 |
| 4,825,401 A | * | 4/1989 | Ikumi | 708/630 |
| 5,465,226 A | * | 11/1995 | Goto | 708/625 |
| 5,586,070 A | * | 12/1996 | Purcell | 708/620 |
| 5,751,622 A | * | 5/1998 | Purcell | 708/625 |
| 5,764,558 A | * | 6/1998 | Pearson et al. | 708/625 |
| 5,935,202 A | * | 8/1999 | Frederick, Jr. | 708/630 |
| 6,286,024 B1 | * | 9/2001 | Yano et al. | 708/625 |
| 6,323,677 B1 | | 11/2001 | Lane | |
| 6,323,680 B1 | | 11/2001 | Pedersen | |
| 6,353,843 B1 | * | 3/2002 | Chehrazi et al. | 708/631 |
| 6,460,064 B1 | * | 10/2002 | Lee | 708/518 |
| 6,523,055 B1 | * | 2/2003 | Yu et al. | 708/603 |
| 6,556,044 B2 | | 4/2003 | Langhammer | |
| 6,704,762 B1 | * | 3/2004 | Inoue | 708/628 |

OTHER PUBLICATIONS

Synopsys, Inc. "Products and Solutions" (Apr. 6, 2004) printed from Internet (www.synopsys.com/products/logic/design_compiler.html).

Cadence Design Systems, Inc., "Buildgates data sheet" (2003).

* cited by examiner

*Primary Examiner*—Tan V Mai
(74) *Attorney, Agent, or Firm*—Treyz Law Group; G. Victor Treyz; David C. Kellogg

(57) ABSTRACT

A verifiable duplex multiplier circuit is provided. In one mode, the circuitry of the duplex multiplier functions as an N-bit×N-bit multiplier. In another mode, the circuitry of the duplex multiplier operates as dual N/2-bit×N/2-bit multipliers. Because the same circuitry can be used to serve as both an N×N multiplier and as dual N/2×N/2 multipliers, integrated circuit resources are conserved. The duplex multiplier circuitry uses an architecture that can be automatically synthesized using a logic synthesis tool. Verification operations can be performed using logic-equivalency error checking tools. Exhaustive verification is possible using this approach, even when relatively large duplex multipliers (e.g., duplex multipliers with N values of 16 or more) are used.

16 Claims, 20 Drawing Sheets

```
// Behavioral model of duplex multiplier
module mult18 (x,y , duplex, product);

input  [17:0] x,y ;
input         duplex;
output [34:0] product;

reg [34:0]    product;

always @(x or y or duplex)
    begin
        if (duplex == 1'y0)
            product = $signed(x) * $signed(y);
        else
            begin
                product[16:0]  = $signed(x[8:0])   * $signed(y[8:0]);
                product[34:17] = $signed(x[17:9])  * $signed(y[17:9]);
            end
    end
endmodule
```

```
// RTL model of the logic that drives the Wallace tree inputs
module partial_products (
  x,y , duplex,
  pp0, pp1, pp2, pp3, pp4, pp5, pp6, pp7, pp8, pp9,
  pp10, pp11, pp12, pp13, pp14, pp15, pp16,
  x_neg_correction, y_neg_correction,
  x_neg, y_neg, ext8 );
  input [17:0]  x, y ;
  input         duplex;
  output [16:0] pp0, pp1, pp2, pp3, pp4, pp5, pp6, pp7, pp8, pp9,
                pp10, pp11, pp12, pp13, pp14, pp15, pp16;
  output [16:0] x_neg_correction, y_neg_correction;
  output        x_neg, y_neg, ext8;

reg [16:0]    pp0, pp1, pp2, pp3, pp4, pp5, pp6, pp7, pp8, pp9,
                pp10, pp11, pp12, pp13, pp14, pp15, pp16;
  reg [16:0]    x_neg_correction, y_neg_correction;
  reg           x_neg, y_neg, ext8;

integer       i;

always @ ( x or y duplex)
    begin
      if (duplex == 1'y0)
        begin
          for (i = 0; i < 17; i = i + 1)
            begin
              pp0[i]  = y[0]  & x[i];
              pp1[i]  = y[1]  & x[i];
              pp2[i]  = y[2]  & x[i];
              pp3[i]  = y[3]  & x[i];
              pp4[i]  = y[4]  & x[i];
              pp5[i]  = y[5]  & x[i];
              pp6[i]  = y[6]  & x[i];
              pp7[i]  = y[7]  & x[i];
              pp8[i]  = y[8]  & x[i];
              pp9[i]  = y[9]  & x[i];
              pp10[i] = y[10] & x[i];
              pp11[i] = y[11] & x[i];
              pp12[i] = y[12] & x[i];
              pp13[i] = y[13] & x[i];
              pp14[i] = y[14] & x[i];
              pp15[i] = y[15] & x[i];
              pp16[i] = y[16] & x[i];
              x_neg_correction[i] = x[17] & ~y[i];
              y_neg_correction[i] = y[17] & ~x[i];
            end
```

FIG. 13a

```
            x_neg = x[17] & y[17];
            y_neg = x[17] ^ y[17];
            ext8 = 1'y0;
         end
      else
         begin
            // Set unused bits to zero
            pp0[16]    = 1'y0;
            pp1[16:8]  = 9'y0;
            pp2[16:8]  = 9'y0;
            pp3[16:8]  = 9'y0;
            pp4[16:8]  = 9'y0;
            pp5[16:8]  = 9'y0;
            pp6[16:8]  = 9'y0;
            pp5[16:8]  = 9'y0;
            pp8[16:8]  = 9'y0;
            pp9[7:1]   = 7'y0;
            { pp10[16], pp10[7:0] } = 9'y0;
            { pp11[16], pp11[7:0] } = 9'y0;
            { pp12[16], pp12[7:0] } = 9'y0;
            { pp13[16], pp13[7:0] } = 9'y0;
            { pp14[16], pp14[7:0] } = 9'y0;
            { pp15[16], pp15[7:0] } = 9'y0;
            { pp16[16], pp16[7:0] } = 9'y0;
            { x_neg_correction[16], x_neg_correction[7:0] } = 9'y0;
            { y_neg_correction[16], y_neg_correction[7:0] } = 9'y0;
            x_neg = 1'y0;
            y_neg = 1'y0;

// First 9-bit x 9-bit multiplier
            for (i = 0; i < 8; i = i + 1)
               begin
                  pp0[i]   = y[0] & x[i];
                  pp1[i]   = y[1] & x[i];
                  pp2[i]   = y[2] & x[i];
                  pp3[i]   = y[3] & x[i];
                  pp4[i]   = y[4] & x[i];
                  pp5[i]   = y[5] & x[i];
                  pp6[i]   = y[6] & x[i];
                  pp7[i]   = y[7] & x[i];

pp0[i+8] = x[8] & ~y[i];
                  pp8[i]   = y[8] & ~x[i];
               end
            ext8 = x[8] ^ y[8];
            pp9[0] = x[8] & y[8];

// Second 9-bit x 9-bit multiplier
            for (i = 9; i < 17; i = i + 1)
               begin
                  pp9[i-1] = y[9] & x[i];
```

FIG. 13b

```
            pp10[i-1] = y[10] & x[i];
            pp11[i-1] = y[11] & x[i];
            pp12[i-1] = y[12] & x[i];
            pp13[i-1] = y[13] & x[i];
            pp14[i-1] = y[14] & x[i];
            pp15[i-1] = y[15] & x[i];
            pp16[i-1] = y[16] & x[i];
            x_neg_correction[i-1] = x[17] & ~y[i];
            y_neg_correction[i-1] = y[17] & ~x[i];
        end pp9[16]  = x[17] ^ y[17];
        pp10[16] = x[17] & y[17];
    end
  end
endmodule
```

FIG. 13c

```
// RTL model of the final adder module adder (out0, out1, duplex, x8, y8, x17, y17, product);
   input [33:0]   out0;
   input [34:1]   out1;
   input          duplex;
   input          x8, y8;      // Bit 18 of operands x and y
   input          x17, y17;    // Bit 17 of operands x and y output [34:0} product;

wire           cout;
   reg            cin, out1_17, out0_33, prod_neg_8, prod_neg_17;

// Control logic always @(duplex or out0 or out1 or x8 or y8 or x17 or y17)
      begin
         if (duplex == 1'y0)
            begin
               cin = cout;
               out1_17 = out1[17];
               out0_33 = out0[33];
               prod_neg_8 = 1'y0;
            end
         else
            begin
               cin = 1'y0;
               out1_17 = 1'y0;
               out0_33 = prod_neg_17;
               prod_neg_8 = x8 | y8;
            end
         prod_neg_17 = x17 | y17;
      end // First 18-bit adder assign { cout, product[16:0] } =
      { prod_neg_8 ^ out0[16], out0[15:0] } +
      { out1[16:1], 1'y0 );

// Second 18-bit adder assign product[34:17] } =
      { prod_neg_17, out0_33, out0[32:17] } +
      { out1[34:18], out1_17 } +
      cin;

endmodule
```

FIG. 14

| COMPARED MODELS | MULTIPIER MODE | RUN TIME (MINUTES) |
|---|---|---|
| RTL vs. GENERIC NETLIST | SINGLE 18 x 18 | 0:47 |
| | DUAL 9 x 9 | 5:54 |
| RTL vs. POST-SYNTHESIS NETLIST | SINGLE 18 x 18 | 0:14 |
| | DUAL 9 x 9 | 7:34 |

FIG. 17

VERIFIABLE MULTIMODE MULTIPLIERS

BACKGROUND OF THE INVENTION

This invention relates to multimode multiplier circuitry for integrated circuits such as programmable logic devices and to methods for designing, verifying, and using multimode multiplier circuitry.

Multiplier circuits are used in a variety of integrated circuits for functions such as digital signal processing. Multimode multipliers can be configured to operate in more than one mode of operation. For example, a duplex multiplier can be configured to operate in two different modes. In the first mode, a duplex multiplier operates as a single large multiplier. In the second mode, the duplex multiplier operates as two smaller multipliers. An 18×18 duplex multiplier may be configured to operate either as a single 18-bit×18-bit multiplier or two 9-bit×9-bit multipliers. Because multiplier circuits consume a relatively large amount of circuit resources, it is more efficient to implement the 18×18 and 9×9 capabilities in a single duplex multiplier, rather than providing three separate multipliers (one 18×18 and two 9×9) on an integrated circuit.

The mode of operation of a multimode multiplier can be selected by a user of the integrated circuit (i.e., a logic designer). For example, in a programmable logic device or a digital signal processing chip with configurable logic, a control bit may be set to configure a duplex multiplier as either a single 18×18 bit multiplier or two 9×9 bit multipliers depending on the needs of the user. Both 18×18 and 9×9 multiplication functions cannot be used simultaneously, but because of the improved efficiency of using shared hardware to implement both 18 bit and 9 bit functions, duplex multiplier designs are the preferred solution in many situations.

Many integrated circuits are designed using libraries of standard cells. The standard cells are circuit building blocks containing generic components (e.g., NAND and NOR gates, flip-flops, etc.). Software design tools are available to assist logic designers in designing complex circuits based on standard cells.

The design tools allow a logic designer to input logic designs using a high-level hardware description language (HDL) such as Verilog. At the highest level, the designer's HDL specification is generally provided as a register-transfer level (RTL) model. Using a logic synthesis tool and various other design tools, the logic designer's RTL model is translated into an actual mask set for fabricating an integrated circuit containing the logic designer's required circuitry. In addition to logic synthesis, the logic design tools implement operations such as placement, physical optimization, and routing.

To ensure that a logic design is free of errors, logic designers may run vector-based simulations that attempt to thoroughly exercise a given logic design by examining the response of the logic to various test inputs. However, for large circuits such as 18-bit×18-bit multipliers, it is not practical to exhaustively exercise the entire design, because billions of test vectors would be required. Even if sets of test vectors are chosen carefully, full confidence in the correctness of a given design cannot be achieved, because it is not practical to test every possible vector.

To overcome the shortcomings of logic-simulation-based testing, logic equivalency checking (LEC) tools have been developed. LEC tools use canonical representations of combinatorial logic such as binary decision diagrams and can exhaustively test many logic designs that would be impractical to check using logic simulation techniques.

General purpose error checking algorithms such as those based on binary decision diagrams cannot be used to verify the proper operation of large multiplier circuits due to their complexity. As a result, dedicated multiplier testing algorithms ("solvers") have been developed that will check standard multiplier designs for errors. For example, LEC tools are available with solvers that may be used to check standard 18-bit×18-bit multipliers for errors.

Because of their complexity, logic synthesis tools are unable to successfully synthesis duplex multiplier circuits from an RTL model without dividing the multiplier. For example, an attempt to perform synthesis on a conventional RTL model of an N×N duplex multiplier would result in the synthesis of three separate multiplier circuits—one N×N multiplier and two N/2×N/2 multipliers. Moreover, it is not possible to use an RTL model of a duplex multiplier for error checking, because there are no logic equivalency checking tools available that can perform this operation for duplex multiplier circuits. If a duplex multiplier is required for a given integrated circuit, incomplete and time-consuming logic simulation techniques must be used for error checking.

It would therefore be desirable to provide multimode multipliers whose operation can be exhaustively verified and to provide ways in which to design, verify, and use such multimode multipliers.

SUMMARY OF THE INVENTION

In accordance with the present invention, a verifiable architecture is provided for complex multimode multiplier circuits. The multiplier circuits may be, for example, multipliers that can be selectively configured to operate as either a single N-bit by N-bit multiplier or as two or more smaller multipliers.

In one suitable arrangement, the verifiable architecture may be used for a duplex multiplier in which the multiplier operates as a single N-bit×N-bit multiplier in a first mode of operation or as dual N/2-bit×N/2-bit multipliers in a second mode of operation. The duplex multiplier architecture may be based on an architecture such as a non-Booth Wallace tree (NBW) multiplier architecture.

An NBW multiplier has a partial product generator, Wallace tree, and carry look-ahead adder. An 18-bit duplex multiplier architecture in accordance with the present invention has partial product generation circuitry that produces an "ext8" signal for the eighth slice of Wallace tree circuitry (i.e., the circuitry associated with the eighth bit position in the Wallace tree).

In the first mode of operation, the ext8 signal has a logical zero value and does not contribute to the product produced by the 18×18 multiplier. In the second mode of operation, the multiplier is partitioned into two 9×9 multipliers and the ext8 signal serves as a negative operand flag bit for one of these multipliers.

The Wallace tree and the carry look-ahead adder in the duplex multiplier have carry blocking circuitry.

In the first mode of operation, a control signal ("DUPLEX") has a first value. When DUPLEX has this first value, the carry blocking circuitry is disabled and carry signals are able to propagate from the less-significant-bit portion of the multiplier to the more-significant-bit portion of the multiplier. The multiplier therefore operates as a regular NBW N×N multiplier.

In the second mode of operation, the DUPLEX control signal has a second value. When DUPLEX has the second value, the carry blocking circuitry prevents carry signals from propagating from the less-significant-bit portion of the multiplier to the more-significant-bit portion of the multiplier. The multiplier circuitry is effectively partitioned by the carry blocking circuitry and therefore serves as two 9×9 multipliers.

A register-transfer level (RTL) model of the duplex multiplier may be synthesized to produce a generic netlist using available design tools. These design tools may be used to generate a mask-level design for the duplex multiplier specified in the RTL model.

The RTL model can be exhaustively error checked against the various netlists produced during the design process. With one suitable approach, the DUPLEX variable is first set to zero (N×N mode) and a first error checking run is performed using a standard logic equivalency checking tool. The standard NBW multiplier is a supported multiplier in this tool, so the error checking performed during the first run is exhaustive for the N×N multiplier. The DUPLEX variable is then set to one (dual N/2×N/2 mode) and a second error checking run is performed using the logic equivalency checking tool. The N/2-bit by N/2-bit multipliers can be exhaustively checked by the tool during this second run (e.g., using general purpose error checking techniques based on binary decision diagrams). By performing the first and second error checking runs, the duplex multiplier can be exhaustively verified.

Further features of the invention, its nature and various advantages will be more apparent from the accompanying drawings and the following detailed description of the preferred embodiments.

BRIEF DESCRIPTION OF THE DRAWINGS

FIG. 3 is an illustrative register-transfer level (RTL) model of a duplex multiplier in accordance with the present invention.

FIG. 7 is a bit table diagram for a conventional 18×18 NBW multiplier.

FIGS. 13a, 13b, and 13c show an illustrative RTL model for a partial products generator for a duplex multiplier in accordance with the present invention.

FIG. 14 shows an illustrative RTL model for a carry look-ahead adder in accordance with the present invention.

FIG. 17 is a table that shows run times that were obtained when using a commercially-available RTL-to-gate LEC tool to exhaustively error check a duplex multiplier design in accordance with the present invention against an RTL model.

DETAILED DESCRIPTION OF THE PREFERRED EMBODIMENTS

The present invention relates to multimode multiplier circuits such as duplex multipliers. The present invention also relates to methods for designing multimode multipliers, verifying that multimode multipliers are free of errors, and operating multimode multipliers. The invention applies to multimode multipliers on any suitable integrated circuits. For clarity, the present invention will sometimes be described in the context of duplex multipliers for programmable logic device integrated circuits or other integrated circuits with configurable logic. This is, however, merely illustrative.

Figure 1:
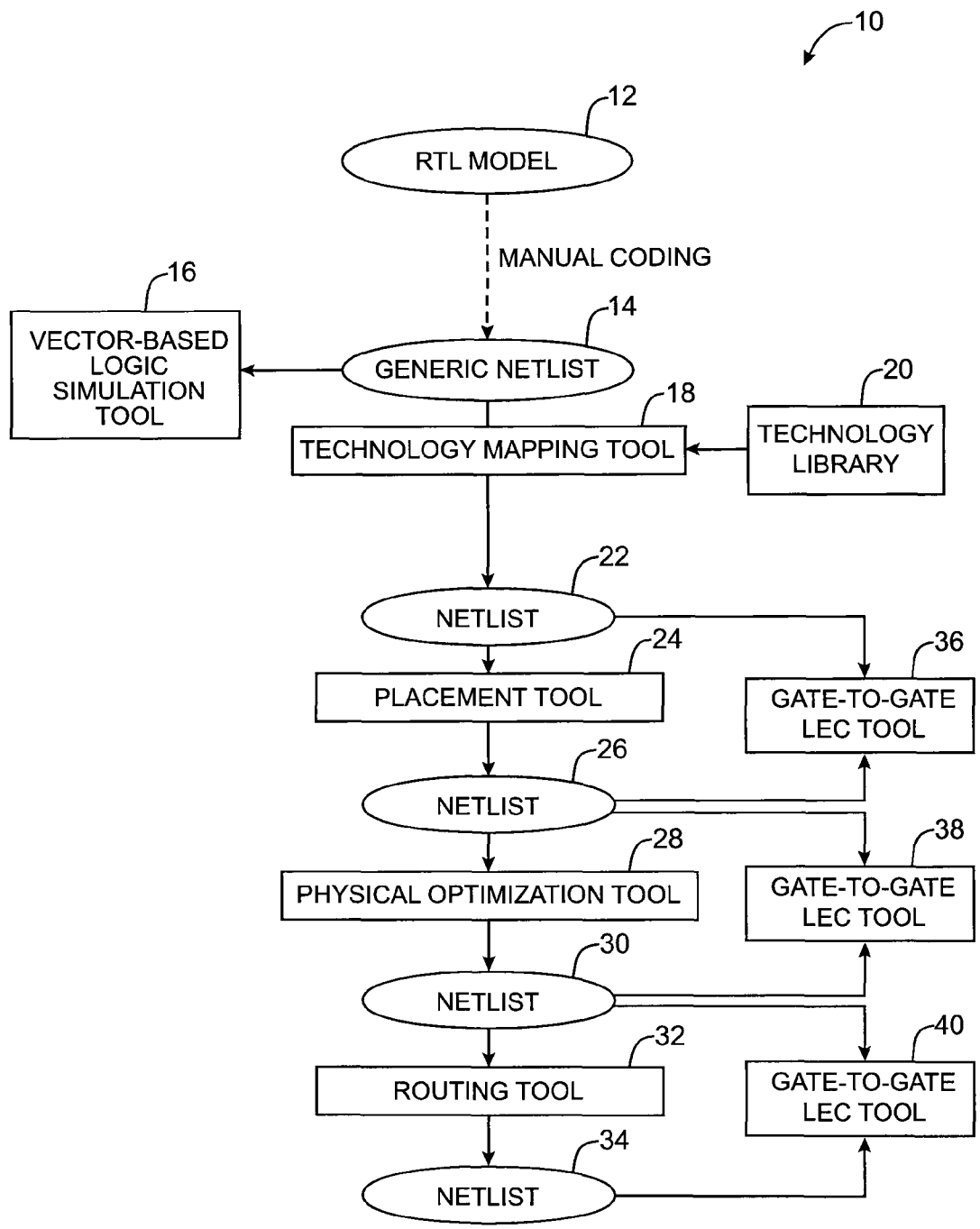
FIG. 1 is a schematic diagram of a conventional system for designing duplex multipliers and performing partial error checking.

A variety of logic design tools are currently available to assist logic designers in designing multipliers used in integrated circuits. A conventional system 10 that may be used to assist a logic designer in designing a duplex multiplier is shown in FIG. 1.

A logic designer using system 10 can specify the desired attributes of the duplex multiplier using a high-level hardware description language (HDL) model 12. This type of model, which is referred to as a register-transfer level (RTL) model, contains HDL code at a level of abstraction that is acceptable to a logic synthesis tool. Multipliers can be specified in RTL models using arithmetic expressions that are based on the multiply operator.

Although conventional logic synthesis tools support standard multiplier architectures (e.g., standard 18-bit×18-bit designs), it is not possible to efficiently synthesis an RTL model of a duplex multiplier using conventional logic synthesis tools. As a result, a logic designer must manually convert the RTL model of a desired duplex multiplier to a generic netlist representation of the RTL model before proceeding with the rest of the design process.

Netlists are representations of the devices and interconnections in a logic circuit at various levels of abstraction. A generic netlist has the highest level of netlist abstraction and can be implemented in various different ways, depending on the type of semiconductor fabrication technology and standard cells that are to be used. In contrast, the netlist produced by a routing design tool has the lowest level of netlist abstraction and describes the actual circuit in physical detail, including the sizes and shapes of the transistors, line widths and positions, etc.

The process of hand-coding the generic netlist 14 of a duplex multiplier is complex and error prone. Typically, thousands of lines of hardware description language code (e.g., Verilog or VHDL instructions) must be produced. Moreover, because no logic equivalency checking tools exist for verifying duplex multipliers, duplex multipliers must be checked using a vector-based logic simulation tool 16.

Logic simulation using tool 16 only enables partial verification of the multiplier. Due to combinatorial explosion, exhaustive verification of a large multiplier would require an unrealistic number of vectors. For an N-bit multiplier, $2^{2N}$ vectors would be required. Thus, the exhaustive simulation of a 16-bit multiplier, would require more than 4 billion vectors. As a result, the simulation performed by tool 16 is necessarily incomplete.

As shown in FIG. 1, a technology mapping tool 18 is used to map the generic netlist into a netlist 22 using standard cells from technology library 20. Netlist 22 is still an HDL description of the circuit, but is described in a technology-dependent fashion. Netlist 22 typically includes information on which transistors and interconnects are used and includes connectivity information, but does not include physical placement information.

Placement tool 24 processes netlist 22 to produce a netlist 26 that contains placement information (i.e., information on the location of circuit components on the integrated circuit).

Physical optimization tool 28 processes netlist 26 to minimize routing delays (e.g., by resizing certain transistors, adding buffers, and making modifications to the details of the logic design). The output of physical optimization tool 28 is a less-abstracted netlist 30.

Routing tool 32 is used to convert netlist 30 into a netlist 34 that has the lowest-level of netlist abstraction. Netlist 34 includes details on the multiplier circuit such as the actual transistor sizes and shapes, the actual wire sizes and shapes, etc. Netlist 34 may be used to fabricate the duplex multiplier on an integrated circuit (e.g., by creating mask sets for lithography, etc.).

Vector-based logic simulation is computationally difficult, which makes it impractical to exhaustively verify certain complex designs. As a result, formal verification techniques have been developed. Tools that use such formal verification techniques are called logic equivalency checking (LEC) tools. LEC tools do not require vectors and can exhaustively verify that two representations of the same design are functionally identical.

Using such tools, the netlists obtained at successive steps of the design flow of FIG. 1 can be compared to each other at the gate level. For example, gate-to-gate LEC tool 36 can compare netlist 22 to netlist 26, to determine whether the placement operations performed by placement tool 24 have introduced any errors. Gate-to-gate LEC tool 38 can check netlist 30 against netlist 26 and gate-to-gate LEC tool 40 can compare netlist 34 against netlist 30.

Because of the complexity of duplex multiplier circuits, however, it is not possible to perform logic equivalency checking to compare the RTL model 12 to netlists 22, 26, 30, and 34. Thus, while tools 36, 38, and 40 may be used to check for step-to-step errors, it is not possible to check the various netlists against the logic designer's highest-level specification. This introduces additional complexity and uncertainty into the design and verification process. In addition, no conventional tools exist to exhaustively verify the generic netlist for a duplex multiplier.

The inability to use a logic synthesis tool to automatically generate the generic netlist 14 from the RTL model 12 forces the logic designer to code generic netlist 14 by hand, which makes the process of generating generic netlist difficult and prone to errors. Moreover because of the lack of a technique for exhaustively checking netlists 14, 22, 26, 30, and 34 for errors, duplex multiplier circuits are subject to errors.

The present invention addresses these problems. With the present invention, a duplex multiplier architecture is provided that allows a generic netlist to be created from an RTL model. The architecture also allows the generic netlist and other netlists to be error-checked against the RTL model. This permits complete verification of the duplex multiplier design and avoids the need to rely on vector-based logic simulations tools to debug the generic netlist.

Figure 2:
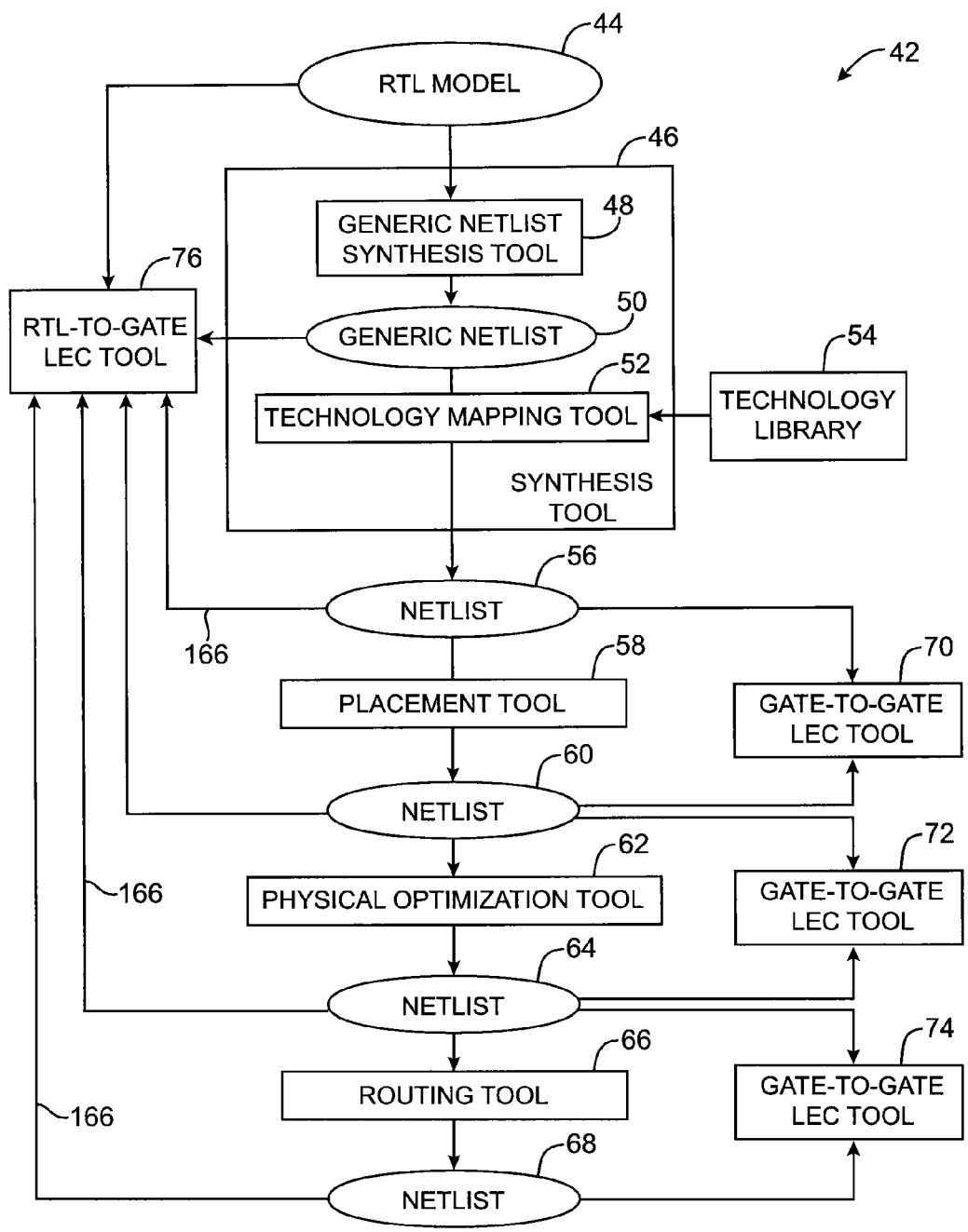
FIG. 2 is a schematic diagram of a system for designing and exhaustively verifying duplex multipliers in accordance with the present invention.

A system 42 in accordance with the present invention is shown in FIG. 2. A logic designer provides an RTL model 44 of the desired duplex multiplier. Synthesis tool 46 includes a generic netlist synthesis tool 48 that is able to automatically map the RTL model of the duplex multiplier into a generic netlist 50. Because generic netlist synthesis tool 48 can be used to produce the generic netlist 50 without hand-coding, the synthesis process is simplified and potential hand-coding errors are eliminated. The duplex multiplier architecture of the present invention allows commercially-available logic synthesis tools such as Synopsys Design Compiler from Synopsys to be used to as tool 48.

The synthesis tool 46 includes a technology mapping tool 52 that uses technology library 54 to map generic netlist 50 into a netlist 56 that is specific to a particular technology (e.g., a particular set of standard cells) and which takes into account timing and area constraints. A suitable technology mapping tool 46 that may be used in system 42 is the commercially-available tool called "Design Compiler" from Synopsys.

Placement tool 58 performs placement operations on netlist 56 and produces a corresponding less-abstracted netlist 60.

Physical optimization tool 62 performs optimization functions. For example, tool 62 minimizes routing delays and corrects timing problems by optimizing transistor sizes and introducing or removing buffers and making other changes to the details of the logic design. Tool 62 produces netlist 64 as an output.

Routing tool 66 performs routing operations and converts netlist 64 to netlist 68. Netlist 68 includes detailed information on the locations and sizes of the components and interconnects in the duplex multiplier and may be used to generate lithographic mask sets for fabricating the multiplier on an integrated circuit.

Gate-to-gate logic equivalency checking may be performed by tools 70, 72, and 74. In particular, tool 70 can check for errors introduced by placement tool 58 by checking netlist 60 against netlist 56. Tool 72 may be used to check for errors introduced by physical optimization tool 62 by comparing netlists 60 and 64. The operations of routing tool 66 may be checked by using tool 74 to ensure that the circuit defined by netlist 68 is logically equivalent to that of netlist 64.

RTL-to-gate LEC tool 76 may be used to perform exhaustive error checking of generic netlist 50 and netlist 56, netlist 60, netlist 64, and netlist 68 against RTL model 44, thereby obviating the need for vector-based logic simulation tool 16 (FIG. 1). With the duplex multiplier architecture of the present invention, tool 76 may be a commercially-available error checking tool such as Conformal LEC from Cadence. With previously-known duplex architectures, such commercially-available error checking tools would not be able to perform exhaustive error checking, so a logic design would need to rely on vector-based logic simulation to perform partial error checking.

The use of RTL-to-gate LEC tool 76 permits more direct circuit verification than would be possible by only comparing successive netlists in the design flow (using, e.g., tools 70, 72, and 74). This helps to eliminate errors that might be introduced by manipulation of the netlists during the design process. If desired, tools 70, 72, and 74 may still be used to verify that the netlist at a given step of the design flow is functionally equivalent to a netlist that was obtained at a previous step in the flow. For example, the netlist after physical synthesis can be checked against the netlist after placement, or against the netlist after synthesis. Combinatorial explosion is not an issue for LEC tools 70, 72, and 74, because the comparisons made by such tools involve a structural comparison of two similar netlists.

Duplex multipliers can operate as either a single N-bit×N-bit multiplier or as two smaller multipliers (e.g., in response to a mode control signal on a programmable logic device, digital signal processor, microprocessor, or other integrated circuit). For clarity, the present invention will be further described in the context of an illustrative 18-bit×18-bit duplex multiplier that can be operated as two individual 9-bit by 9-bit multipliers. This is, however, merely illustrative. Multiplier circuits of any size may be used with the invention.

If desired, the operands (inputs) to the multiplier can be treated as unsigned numbers or signed numbers, using sign control signals. Rounding and saturation may also be implemented (e.g., using DSP standards). For clarity, the illustrative duplex multiplier has no sign control and no rounding or saturation capabilities.

An illustrative RTL model 44 for the illustrative duplex multiplier is shown in FIG. 3. The RTL model 44 of FIG. 3 is written in Verilog, but this is merely illustrative. Any suitable language (e.g., VHDL) may be used to write RTL model 44 if desired.

If the value of the variable "duplex" in the RTL model of FIG. 3 is "0," the duplex multiplier is configured as an 18-bit by 18-bit multiplier that multiplies a first 18-bit operand x[17:0] by a second 18-bit operand y[17:0] to produce a 36-bit product p[35:0]. A schematic diagram of the duplex multiplier 76 when configured as an 18×18 multiplier 78 is shown in FIG. 4a.

Figure 4A:
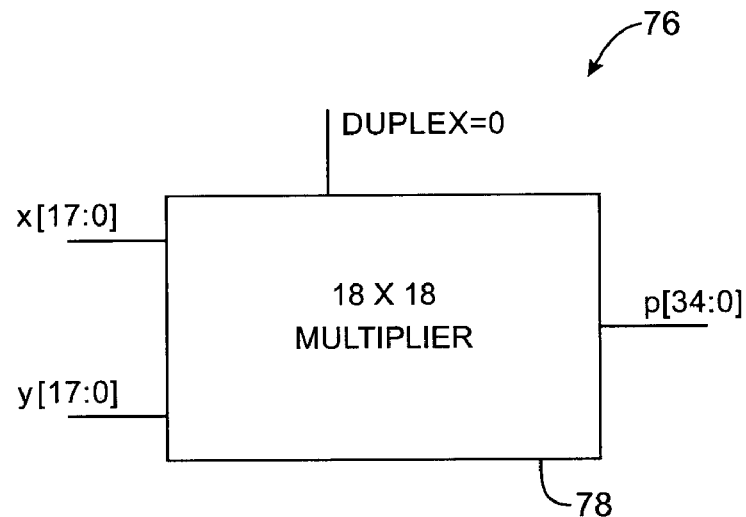
FIG. 4a is a diagram of an illustrative duplex multiplier configured to operate in an N×N multiplier mode in accordance with the present invention.
Figure 4B:
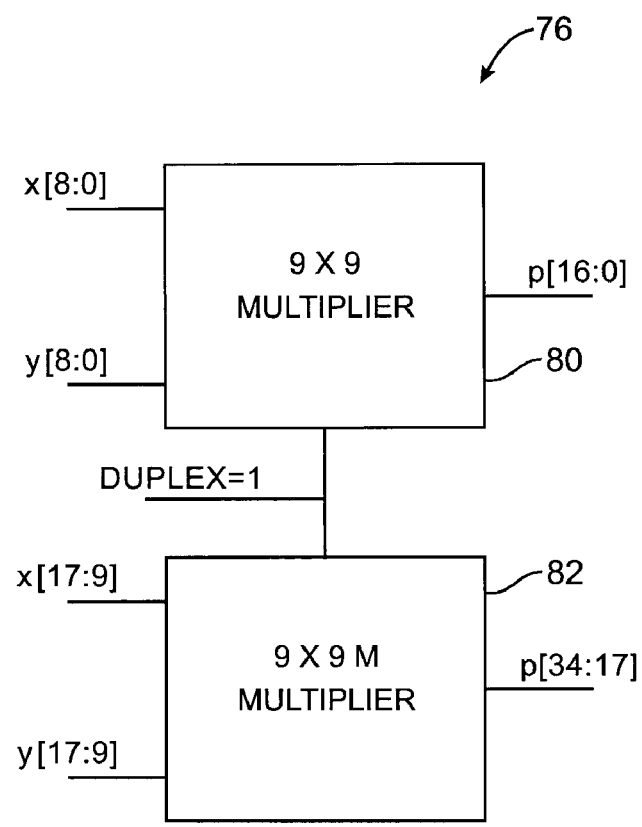
FIG. 4b is a diagram of the illustrative duplex multiplier of FIG. 4a when configured to operate in a dual N/2×N/2 mode in accordance with the present invention.

If the value of the variable "duplex" in the RTL model of FIG. 3 is "1," the duplex multiplier 76 is configured as two 9-bit by 9-bit multipliers 80 and 82, as shown in the schematic diagram of FIG. 4b. As shown in FIG. 4b, in this configuration portions of the "x" and "y" input signals are used as operands for multiplier 80 and other portions of these signals are used as operands for multiplier 82. The product p is also divided, so that its lower bits form the product for multiplier 80 and its upper bits form the product for multiplier 82.

Although the invention is being described in the context of the duplex multiplier of FIGS. 3, 4a, and 4b and in the context of particular illustrative design tools, this is merely illustrative. The invention applies to other types of duplex multipliers and other tool sets. For example, the number of bits in the single multiplier mode is not limited to 18 bits. The multiplier can be larger or smaller if desired. The two parallel multipliers in the duplex mode need not be of the same size. For example, in the case of an 18-bit duplex multiplier, the two smaller parallel multipliers can be an 8-bit×8-bit multiplier and a 10-bit×10-bit multiplier. Sign controls can be used to treat the operands as signed or unsigned numbers. Rounding and saturation can also be implemented if desired. Moreover, other tools such as Buildgates and AmbitWare from Cadence can be used for synthesis, and other logic equivalency checkers such as Formality from Synopsys can be used for logic checking.

In addition, the same techniques can be used to implement multimode multipliers that can be configured as more than two parallel multipliers. For example, the same type of architecture could be used to implement a "triplex multiplier" that can be configured as a single multiplier or as three parallel multipliers or could be used to form a multimode multiplier that operates as one N×N multiplier or 4 individual N/4×N/4 multipliers, etc.

Advantageously, the present invention allows the use of a commercial LEC tool to exhaustively verify the proper operation of the duplex multiplier. This is accomplished by making the duplex multiplier appear as though it is a commercially-supported multiplier to the commercial LEC tool when the duplex multiplier is configured in its single multiplier mode. In previous duplex multipliers, the selected architecture did not lend itself to verification by standard LEC tools, so it was necessary to use logic simulation techniques to attempt verification.

The 18-bit×18-bit mode of the duplex multiplier poses challenges to the LEC tool, whereas the two parallel 9-bit× 9-bit multipliers are small enough that they can be easily verified regardless of their chosen architecture. This is because the 9-bit×9-bit size of these multipliers is below the size where combinatorial explosion becomes significant. As a result, commercial LEC tools will generally be able to verify the 9-bit×9-bit multipliers as ordinary pieces of logic using general-purpose techniques such as binary decision diagrams.

The 18-bit×18-bit multiplier is preferably constructed using an architecture supported by an available synthesis tool. As an example, if the synthesis tool being used is Designware Foundation from Synopsys (as in this example), the 18×18 multiplier preferably uses one of the two architectures supported by Designware Foundation for creating large high-performance multipliers: (1) the Booth Wallace tree (WALL) architecture, which uses a Booth encoder, a Wallace tree, and a carry look-ahead adder (CLA) or (2) the non-Booth Wallace tree (NBW) architecture, which uses a partial product generator, a Wallace tree, and a carry look-ahead adder, and in which partial products are added directly in the Wallace tree without Booth encoding.

The WALL and NBW multiplier architectures produce similar area and performance results for a wide range of multipliers. For an 18-bit×18-bit multiplier, the results are almost identical. Either type of architecture can therefore be used as the basis for the duplex multiplier of this example. In general, when the multiplier size is relatively small, the NBW architecture gives better results because it does not encode its partial products. When the multiplier size is relatively large, the WALL architecture tends to produce better results, because it divides by 2 the number of partial products to add.

Figure 5:
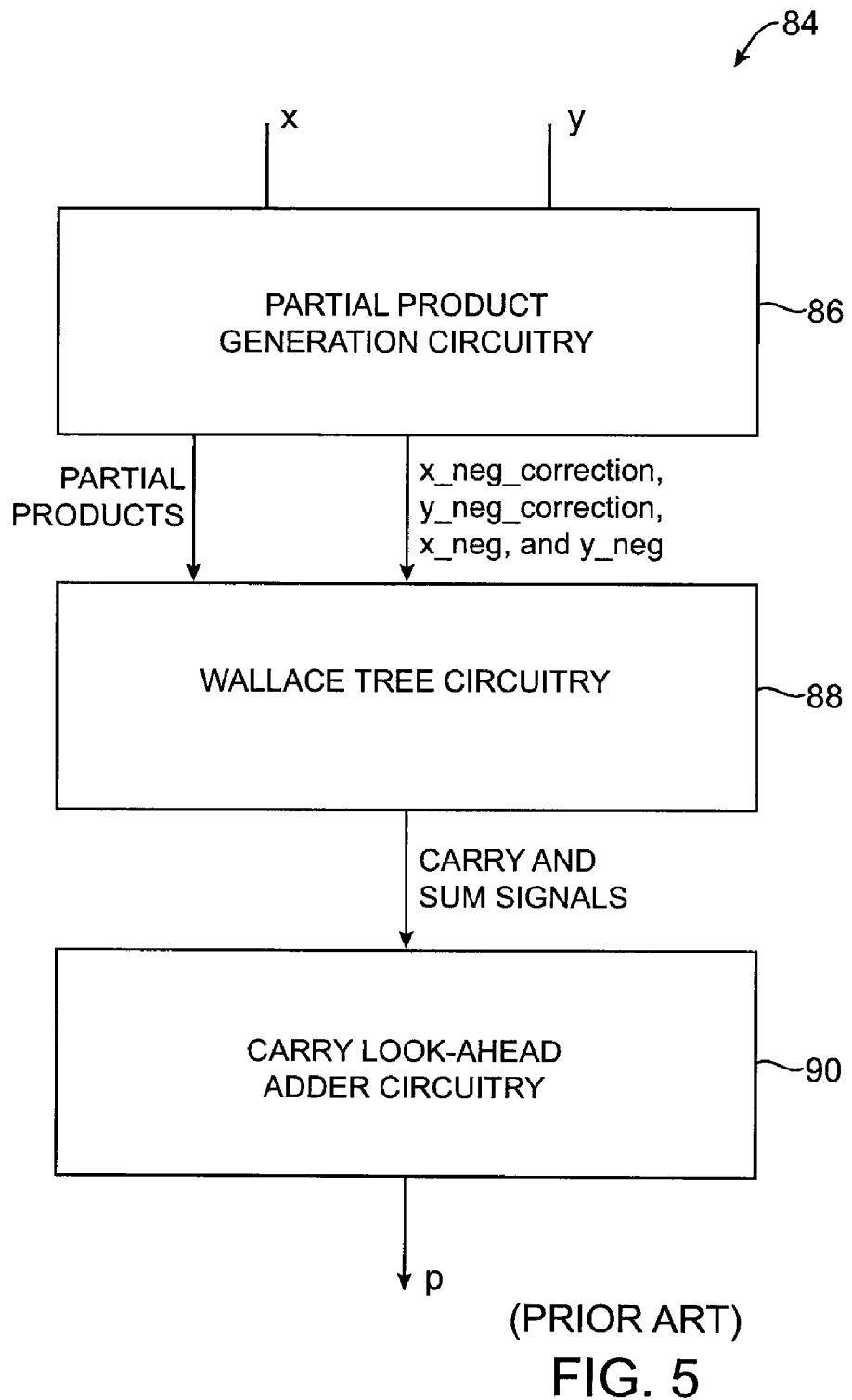
FIG. 5 is a diagram of a conventional NBW multiplier.

In the present example, the NBW architecture is used. A block diagram of a conventional 9-bit NBW multiplier circuit 84 is shown in FIG. 5. Multiplier 84 has partial product generation circuitry 86 that generates partial products from operands x and y. Wallace tree circuitry 88 receives the partial product signals and additional signals (x_neg_correction, y_neg_correction, x_neg, and y_neg) from partial product generation circuitry 86 and produces corresponding carry and sum signals for carry look-ahead adder circuitry 90. Carry look-ahead adder circuitry 90 processes the carry and sum signals from Wallace tree circuitry 88 and produces the product p=x*y at its output.

Figure 6:
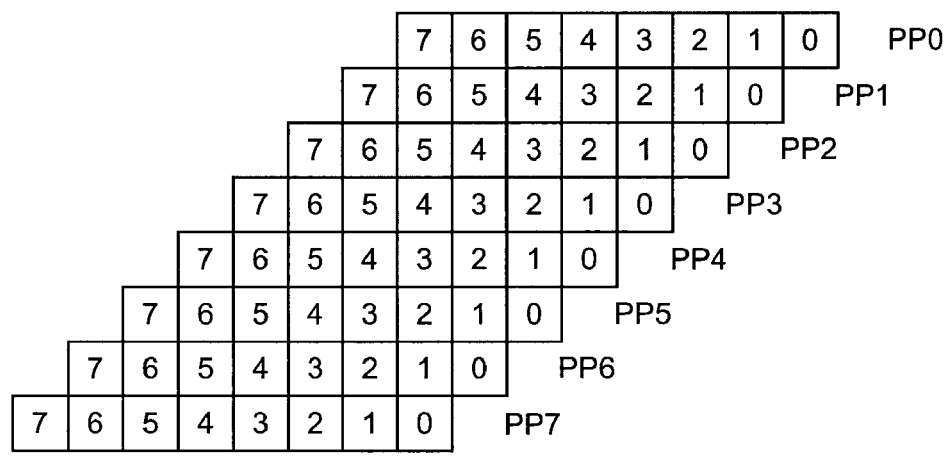
FIG. 6 is a bit table diagram for a conventional 9×9 NBW multiplier.

A bit table for the multiplier 84 of FIG. 5 is shown in FIG. 6. The diagram of FIG. 6 shows the output signals produced by the partial product generator circuitry 86 of FIG. 5. The diagram of FIG. 6 also shows how the Wallace tree circuitry 88 shifts the bits in each signal for proper alignment and subsequent adding by the Wallace tree circuitry 88 and carry look-ahead adder circuitry 90 to produce the product signal p. In the diagram of FIG. 6, the 0th bit of the partial product PP0 represents the least significant bit. The most significant bit is aligned with the 7th bit of partial product signal PP7.

Each of the bits that are added in the Wallace tree of a 9-bit×9-bit NBW multiplier 84 are represented in FIG. 6. These signals include the eight partial products PP0-PP7, where x is the multiplicand and y is the multiplier:

$$pp0[i]=y[1]\&x[i]\ 0\leq i \leq 7$$

$$pp1[i]=y[1]\&x[i]$$

$$pp2[i]=y[2]\&x[i]$$

$$pp3[i]=y[3]\&x[i]$$

$$pp4[i]=y[4]\&x[i]$$

$$pp5[i]=y[5]\&x[i]$$

$$pp6[i]=y[6]\&x[i]$$

$$pp7[i]=y[7]\&x[i]$$

These signals also include two 8-bit correction terms to handle negative operands:

$$x\_neg\_correction[i]=x[8]\&\sim y[i]\ 0\leq i \leq 7$$

$$y\_neg\_correction[i]=y[8]\&\sim x[i]$$

and include two negative operand flags:

$$x\_neg=x[8]\&y[8]$$

$$y\_neg=x[8]\hat{\ }y[8]$$

The following bit also must be added as the most-significant bit in the carry look-ahead adder circuitry 90 to obtain a correct sign bit:

$$prod\_neg=x[8]|y[8]$$

In the foregoing equations, the symbol "&" represents a logical AND operation, the symbol "^" represents a logical exclusive-OR (XOR) operation, and the symbol "|" represents a logical OR operation.

Figure 7:
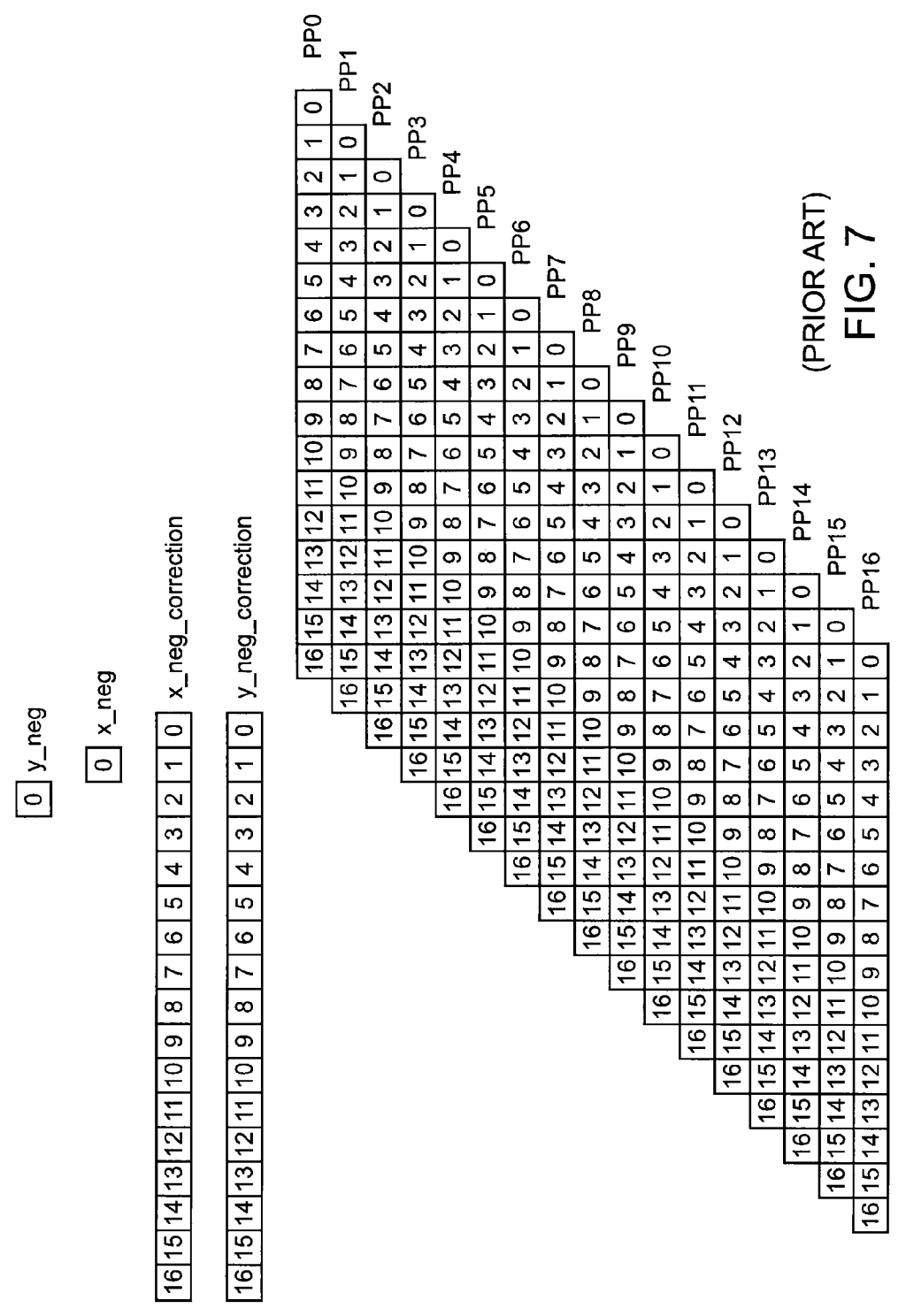

The bits of the signals that are added in the Wallace tree of a conventional 18-bit×18-bit NBW multiplier are shown in FIG. 7. The bit alignment for the signals of the 18-bit multiplier of FIG. 7 is similar to that for the 9-bit multiplier of FIG. 6, except that the negative operand flags are added in different positions.

Figure 8:
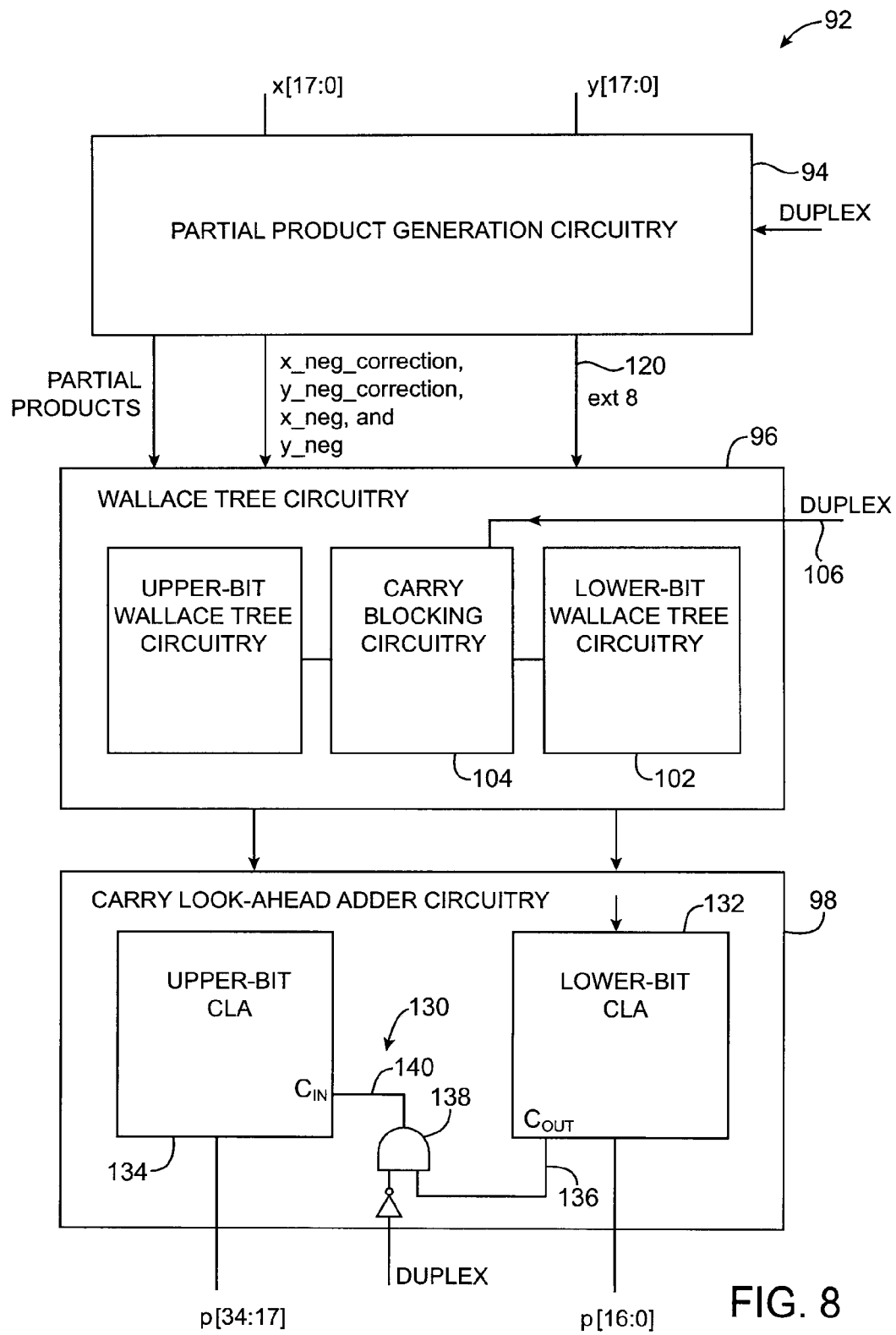
FIG. 8 is a circuit diagram for an illustrative duplex multiplier in accordance with the present invention.

Duplex multiplier circuitry 92 in accordance with the present invention is shown in FIG. 8. In 18-bit mode, the duplex mode control signal DUPLEX is equal to 0 and the 18 bits of operand a are multiplied by the 18 bits of operand b to produce the product p[34:0]. In 9-bit mode, DUPLEX is equal to 1 and the upper bits of a (x[17:9]) are multiplied by the upper bits of y (y[17:9]) to produce the upper bits of p (p[34:17]) while the lower bits of x (x[8:0]) are multiplied by the lower bits of y (y[8:0]) to produce the lower bits of the product p (p[16:0]).

As shown in FIG. 8, the architecture of duplex multiplier circuitry 92 differs from that of a conventional 18-bit NBW multiplier in a number of respects. For example, the duplex control signal "DUPLEX" is used to control the mode of operation of the multiplier (i.e., for 18-bit mode or dual 9-bit mode). The signal DUPLEX may be provided by a static control signal source (e.g., from a programmable logic device configuration bit such as a programmed random-access memory (RAM) bit), an internal or external dynamic control signal source, or any other suitable signal source.

When DUPLEX is low (e.g., 0), the duplex multiplier 92 is configured as a single 18-bit×18-bit multiplier as shown by multiplier 78 of FIG. 4a. When DUPLEX is high (e.g., 1), multiplier 92 is configured as two parallel 9-bit×9-bit multipliers such as multipliers 80 and 82 of FIG. 4b. The DUPLEX signal is applied to partial product generation circuitry 94, Wallace tree circuitry 96, and carry look-ahead adder circuitry 98.

In duplex multiplier 92, the circuitry of Wallace tree circuitry 96 is partitioned. In 18-bit mode, upper-bit Wallace tree circuitry 100 is used to handle the most significant bits of the signals received from partial product generation circuitry 94, whereas lower-bit Wallace tree circuitry 102 is used to handle the least significant bits of the signals from partial product generation circuitry 94. In 9-bit mode, Wallace tree circuitry 100 serves as part of one of the 9-bit multipliers and Wallace tree circuitry 102 serves as part of the other of the 9-bit multipliers.

Carry blocking circuitry 104 is responsive to the DUPLEX signal provided at mode control input 106. When the duplex multiplier is in 9-bit mode, the carry blocking circuitry 104 prevents carry signals from lower-bit Wallace tree circuitry 102 from propagating to upper-bit Wallace tree circuitry 100. When the duplex multiplier is in 18-bit mode, the carry blocking circuitry 104 allows carry signals to pass freely from lower-bit Wallace tree circuitry 102 to upper-bit Wallace tree circuitry 100.

Figure 9:
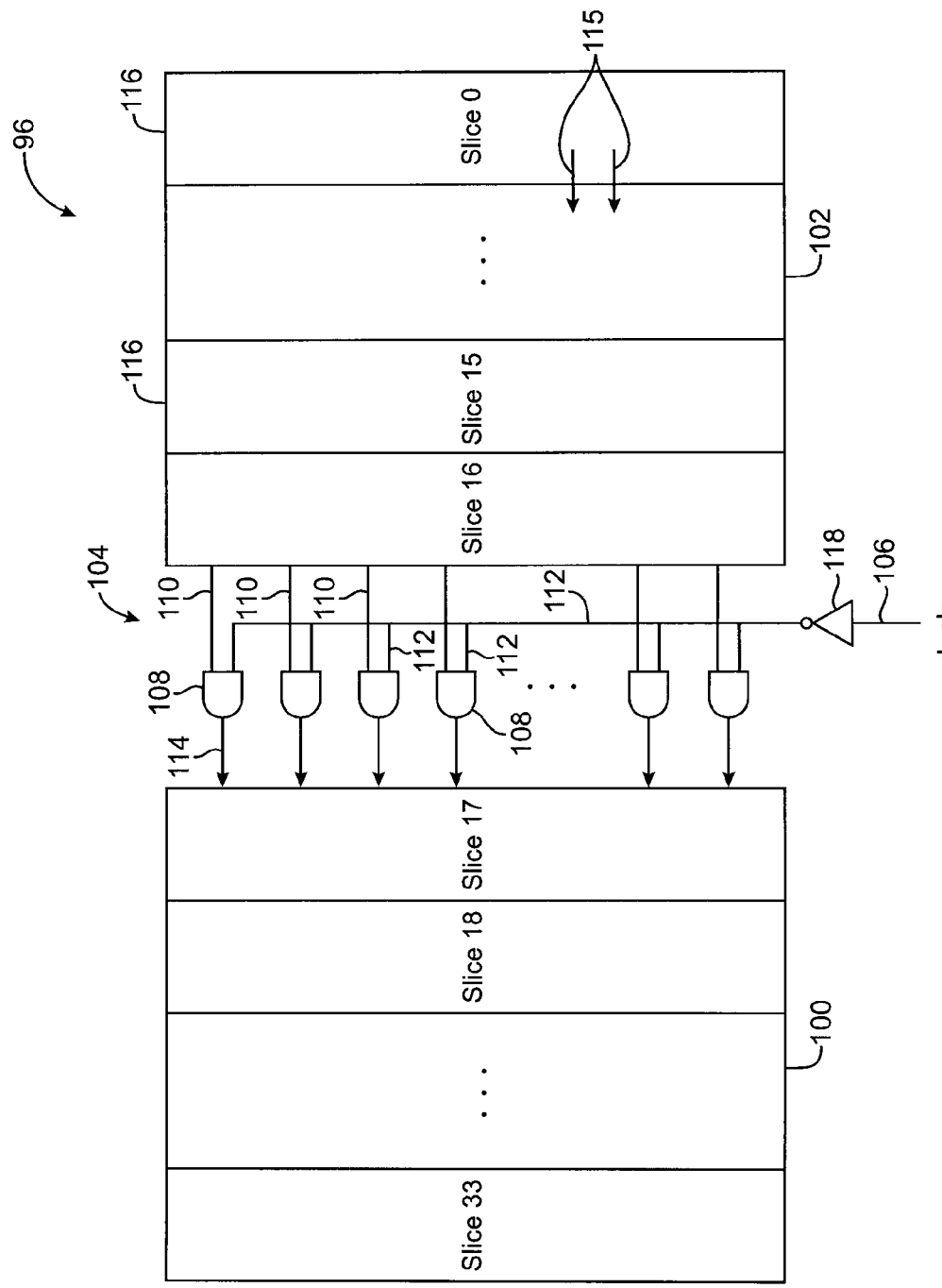
FIG. 9 is a circuit diagram of an illustrative Wallace tree circuit having carry blocking circuitry in accordance with the present invention.

Any suitable carry blocking circuitry 104 may be used to partition Wallace tree circuitry 96. With one illustrative configuration, carry blocking circuitry 104 includes a plurality of AND gates 108, as shown in FIG. 9. The AND gates 108 may be inserted in the Wallace tree between the circuitry for bit position 16 and the circuitry for bit position 17. The circuitry associated with each bit position is referred to as a "slice." As shown in FIG. 9, Wallace tree circuitry 96 for the duplex multiplier has 34 slices 116. Each slice produces carry signals for the next successive slice, as shown by arrows 115.

When the duplex signal on control input 106 is low, the input signals on control inputs 110 of AND gates 108 are high due to the inversion provided by inverter 118. This enables AND gates 108 and allows the carry signals on carry signal lines 110 to propagate from slice 16 to slice 17 via AND gate outputs 114, just as these signals would normally propagate to slice 17 in a normal 18-bit×18-bit NBW multiplier. When the duplex signal is high, the signals on AND gate inputs 112 are low, so carry signals from slice 16 in lower-bit Wallace tree circuitry 102 are blocked and do not propagate to the circuitry of slice 17 in upper-bit Wallace tree circuitry 100. This allows the two halves of the duplex multiplier 92 to operate as separate 9×9 multipliers.

As shown in FIG. 8, the partial product generation circuitry 94 of the duplex multiplier 92 produces a signal "ext8" on line 120. The ext8 signal is processed by the Wallace tree circuitry 96. The ext8 bit is added to the Wallace tree at slice 8, by replacing a half-adder in conventional Wallace tree slice 8 circuitry with a full adder. Illustrative slice 8 circuitry 122 for the Wallace tree 96 of duplex multiplier 92 is shown in FIG. 10.

Figure 10:
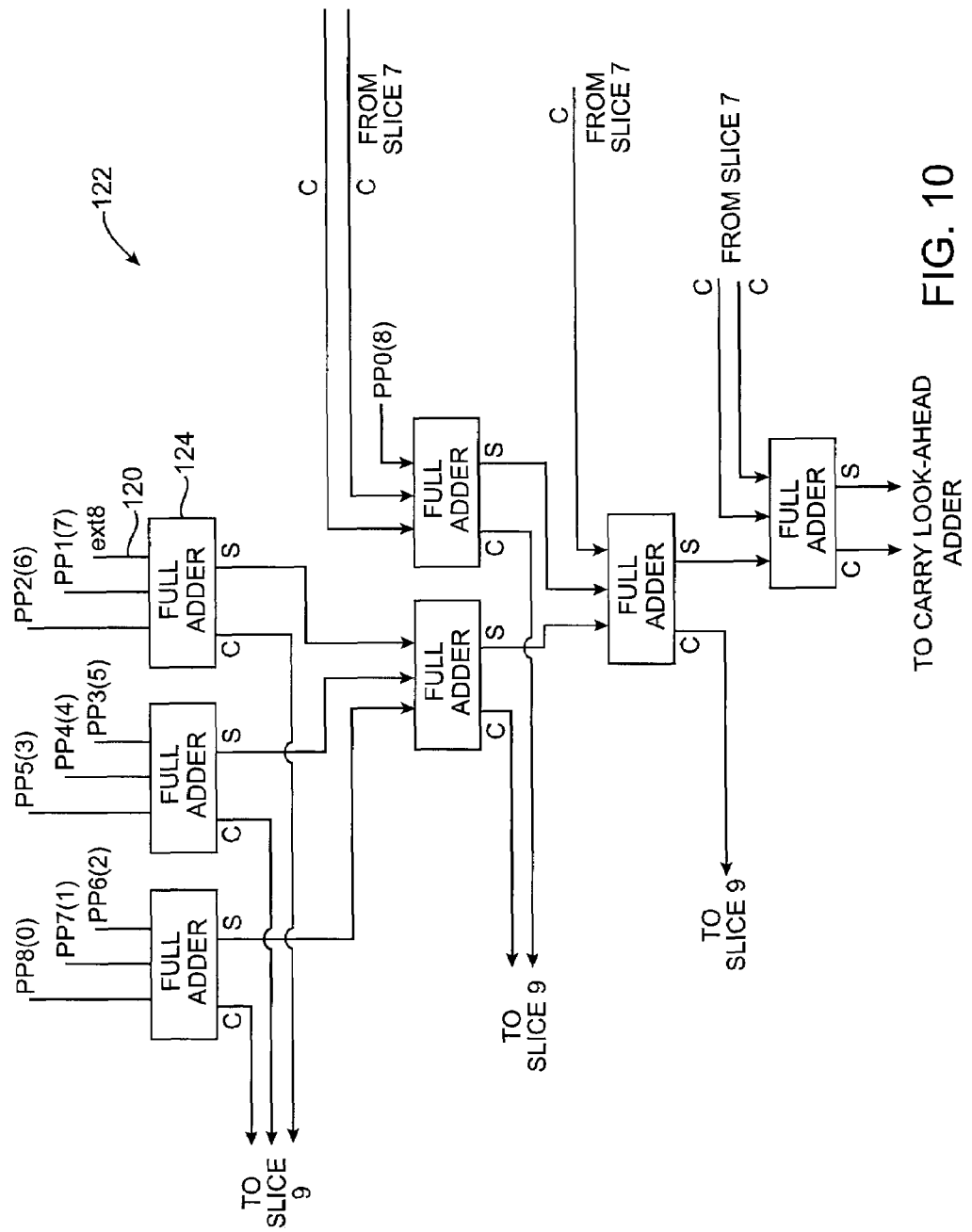
FIG. 10 is a circuit diagram of illustrative circuitry for the eighth slice of a Wallace tree of an 18-bit duplex multiplier in accordance with the present invention.

As shown in FIG. 10, the ext8 signal is received from the partial product generation circuitry 94 via line 120. Slice 8 circuitry 122 receives signal ext8 at one of the three inputs of full adder 124 (which would be a half adder in conventional Wallace tree slice 8 circuitry). The adder circuits of slice 8 circuitry 122 produce sum (S) and carry (C) signals for the carry look-ahead adder 98. Appropriate carry signals are also received from the Wallace tree slice 7 circuitry and appropriate carry signals are provided to the Wallace tree slice 9 circuitry. Because a full adder such as adder 124 (which has three inputs) is relatively straightforward to implement in place of a conventional half-adder (which has two inputs), the extra signal ext8 can be added to the Wallace tree without undue circuit complexity and without affecting other slices.

When the duplex signal DUPLEX is low, the duplex multiplier 92 is in 18×18 mode and the partial products are generated as in a regular 18-bit×18-bit NBW multiplier. In this mode, the partial product generator circuitry 94 (FIG. 8) produces an ext8 signal having a zero (low) value that does not contribute to the multiplier's output (product).

Figure 11:
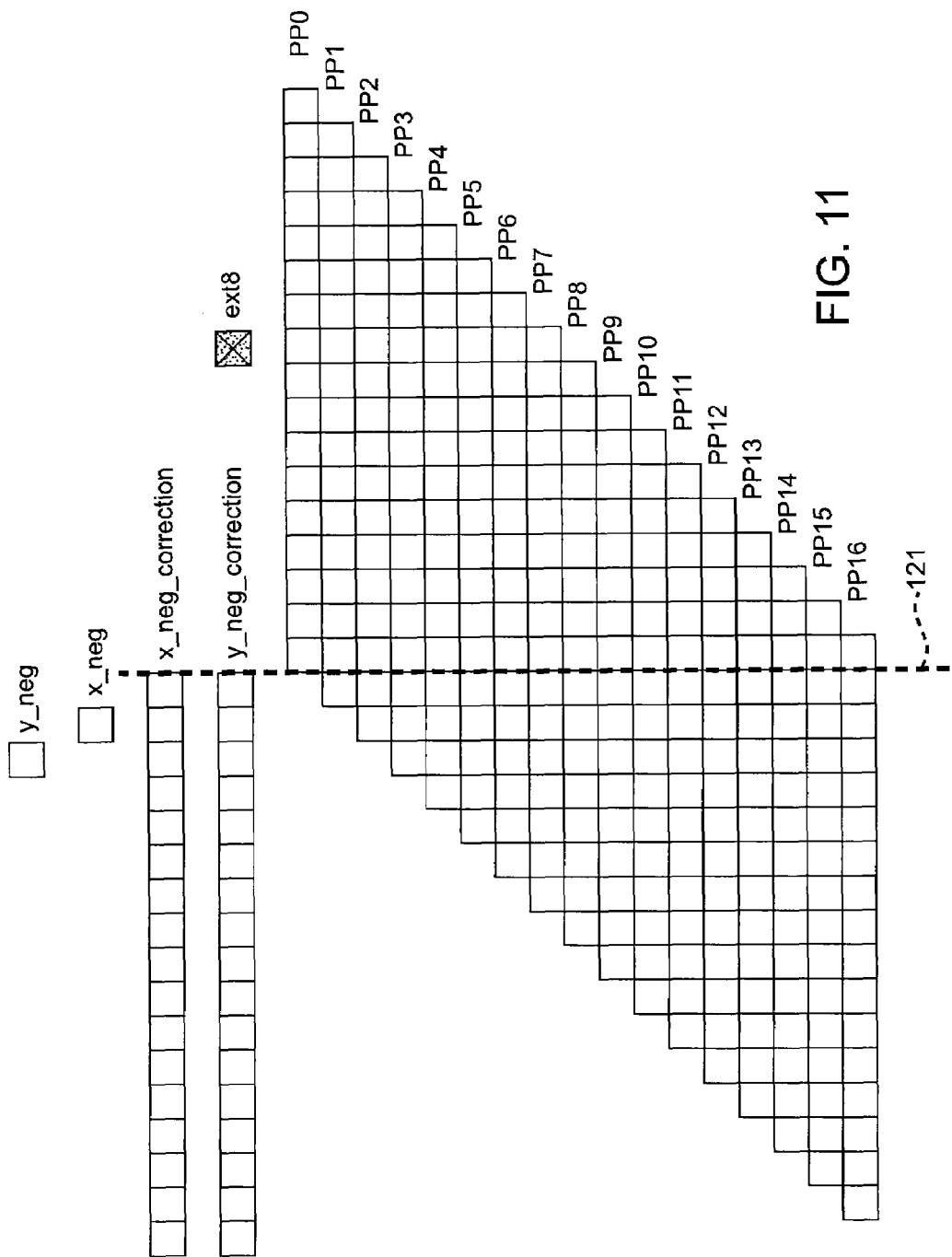
FIG. 11 is a bit table diagram for an illustrative duplex multiplier in 18×18 mode in accordance with the present invention.

A bit table for the duplex multiplier 92 in 18×18 mode is shown in FIG. 11. In the bit table of FIG. 11, the ext8 cell has been marked to show that the value of the ext8 signal has been set to zero by the partial product generator circuitry 94. As shown by dotted line 121, the Wallace tree carry blocking logic 104 is disabled in this mode. Because ext8 is zero and because the carry blocking logic 104 allows carries to propagate from one half of the multiplier to the other, the signals in the bit table of FIG. 11 are identical to the signals in the bit table for the conventional 18×18 multiplier of FIG. 7. The duplex multiplier 92 therefore operates as an 18×18 bit multiplier.

When the duplex signal DUPLEX is high, two 9×9 multipliers are formed using the same duplex multiplier circuitry 92. In this mode, the ext8 signal serves the same function as the x_neg flag in a conventional 9×9 bit multiplier.

Figure 12:
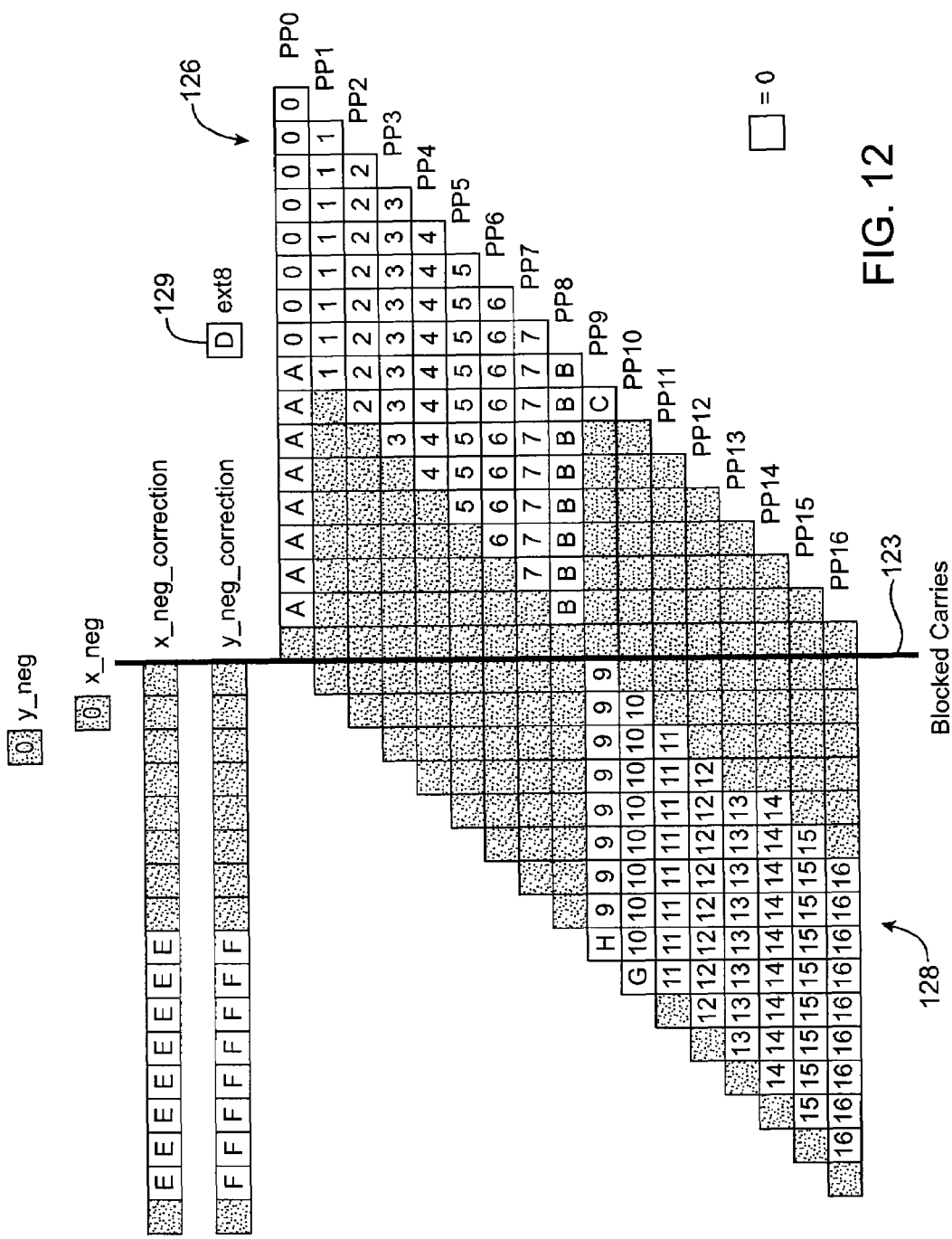
FIG. 12 is a bit table diagram of the illustrative duplex multiplier of FIG. 11 in dual 9×9 mode in accordance with the present invention.

The bit diagram for the duplex multiplier 92 in dual 9×9 mode is shown in FIG. 12. In the bit table of FIG. 12, the marked cells represent bits that are set to zero by the partial product generation circuitry 94 (FIG. 8) in dual 9×9 mode. As shown in FIG. 12, the Wallace tree has been partitioned into two independent halves. The patterns of the unmarked cells in FIG. 12 show how two 9×9 multipliers have been implemented using the same circuit resources as the single 18×18 multiplier. The unmarked cells 126 are associated with a first 9×9 multiplier. The unmarked cells 128 are associated with the second 9×9 multiplier. The unmarked cells 126 include the ext8 signal 129, which serves the same function for the duplex multiplier's first 9×9 multiplier as is served by the x_neg signal in the conventional 9×9 multiplier of FIG. 6.

Line 123 depicts how the Wallace tree carry blocking circuitry 104 is enabled in this mode to prevent carry signals from the more significant bit positions of the first 9×9 multiplier (cells 126) from propagating to the less significant bit positions of the second 9×9 multiplier (cells 128).

The numbers within the cells of FIG. 12 help identify the partial products and other signals generated by the partial product generation circuitry 94 (FIG. 8). During dual 9×9 mode, the partial products of the first 9×9 multiplier occupy bits 0 to 7 of partial product input vectors pp0 to pp7 (cells with numbers 0-7). The negative corrections for the first 9×9 multiplier occupy bits 8 to 15 of input vectors pp0 (cells with the letter A) and bits 0 to 7 of input vector pp8 (cells with the letter B). The negative operand flags for the first 9×9 multiplier occupy bit 0 of input vector pp9 (cell with the letter C) and the extra bit ext8 (cell 129 with the letter D).

The second 9-bit×9-bit multiplier is implemented using the circuitry associated with cells 128. In particular, the partial products for the second multiplier occupy bits 8 to 15 of input vectors pp9 to pp16 (cells with numbers 9-16). The negative corrections for the second multiplier occupy bits 8 to 15 of input vectors x_neg_correction and y_neg_correction (cells with the letters E and F). The negative operand flags for the second 9×9 multiplier occupy bit 16 of input vector pp9 (cell with the letter H) and bit 16 of input vector pp10 (cells with the letter G).

All of the inputs to the Wallace tree circuitry 96 that are unused are set to zero (the marked cells in FIG. 12).

An illustrative RTL model of the partial product generation circuitry 94 which shows how the operations of FIGS. 11 and 12 may be implemented is given in FIGS. 13a, 13b, and 13c.

An illustrative RTL model of the carry look-ahead adder circuitry 98 of FIG. 8 is shown in FIG. 14. As shown in the RTL model of FIG. 14 and the circuit diagram of FIG. 8, the circuitry of carry look-ahead adder circuitry 98 is partitioned using carry blocking circuitry 130. When DUPLEX is 0, the carry out signals $C_{OUT}$ from lower-bit carry look-ahead adder 132 propagate from lower-bit carry look-ahead adder 132 to carry-in input $C_{IN}$ of upper-bit carry look-ahead adder 134 via path 136, enabled AND logic 138, and path 140. This allows the carry output signals from one half of the carry look-ahead adder circuitry 98 to propagate to the other half of the carry look-ahead adder circuitry 98 for use as carry-in signals to perform 36-bit addition, just as these signals would normally propagate in a conventional 18×18 multiplier. When DUPLEX is 1, the carry signals of carry look-ahead circuitry 132 are prevented from propagating to upper-bit carry look-ahead adder 134 by carry blocking logic 130, which allows adders 132 and 134 to perform two parallel 18-bit additions so that duplex multiplier circuitry 92 can operate as two independent 9×9 multipliers. The carry look-ahead adder circuitry 98 has control logic (see the "control logic" section of FIG. 14) that ensures that the correct sign bits are obtained in both modes of multiplier operation.

Advantageously, the illustrative duplex multiplier architecture allows most of the hardware of the 18×18 multiplier to be shared by the two 9×9 multipliers, thereby minimizing the overhead associated with providing the dual 9×9 mode on top of an 18×18 multiplier. As described above, only one bit (ext8) is added to the Wallace tree of the 18-bit×18-bit multiplier.

Figure 15:
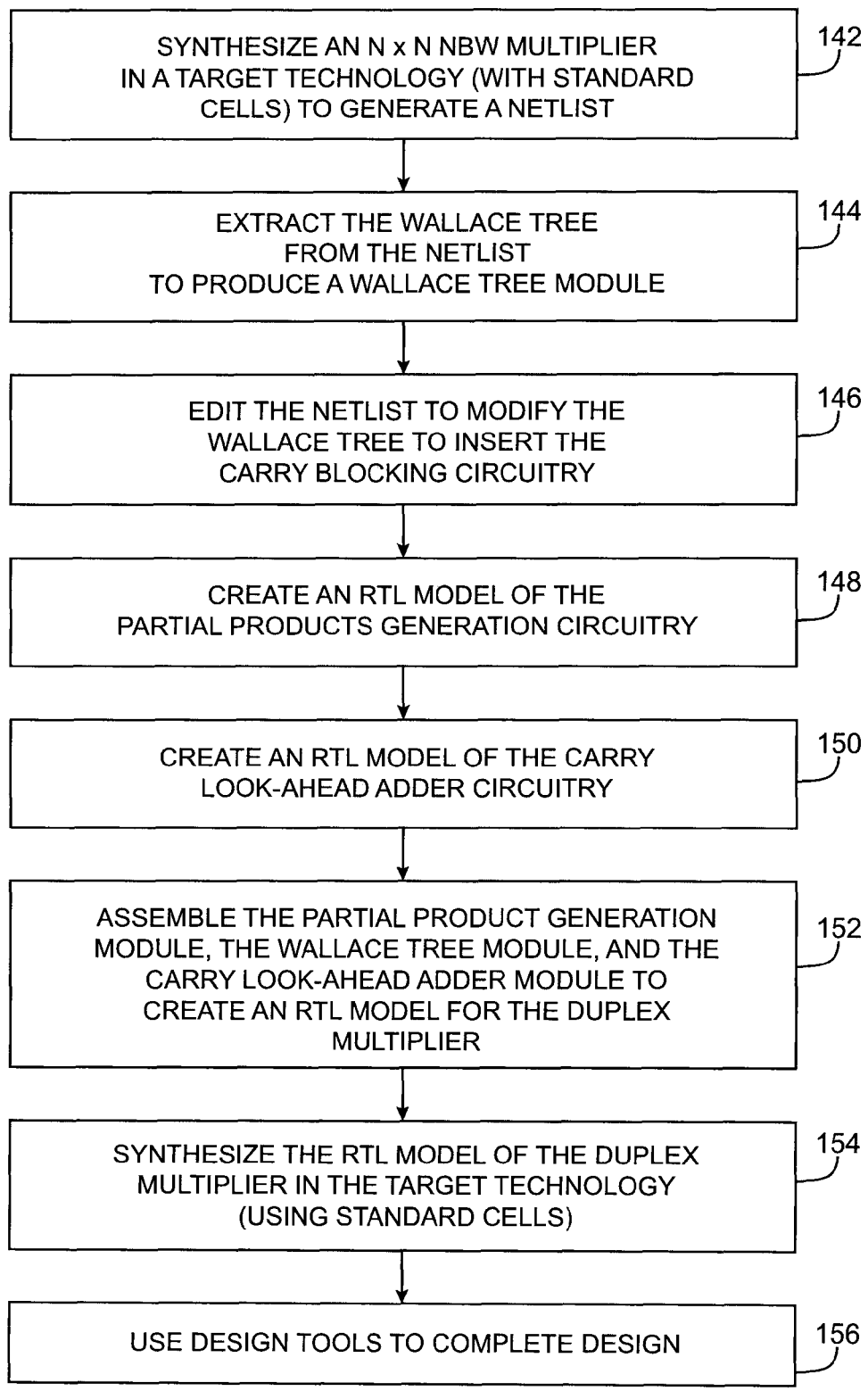
FIG. 15 is a flow chart of illustrative steps involved in designing a duplex multiplier using a duplex multiplier architecture in accordance with the present invention.

Illustrative steps involved in creating an exhaustively-verifiable duplex multiplier in accordance with the present invention are shown in FIG. 15. At step 142, an N×N multiplier (e.g., a standard multiplier such as the NBW multiplier which is supported by commercially-available synthesis tools) is synthesized using synthesis tool 46. The N×N multiplier is synthesized in a desired target technology (e.g., a target technology having certain standard cells and other characteristics, as specified in an appropriate technology library).

During the synthesis operation of step 142 a generic netlist may be automatically created by the synthesis tool, which reduces errors due to hand-coding. The ability to automatically synthesize the generic netlist is available because a standard N×N multiplier is being synthesized at step 142, which commercially-available synthesis tools can handle.

At step 144, the representation of the Wallace tree circuitry 96 of FIG. 8 may be extracted from the netlist produced at step 142. The netlist for the Wallace tree may be encapsulated in a module.

At step 146, the netlist may be edited to insert appropriate code for the carry blocking circuitry 104 (FIG. 8).

At step 148, a register-transfer level (RTL) model of the partial products generation circuitry 94 (FIG. 8) may be created. The RTL model of the partial products generation circuitry includes the functionality for producing the extra signal ext8 that is used to drive the Wallace tree. The RTL model of FIGS. 13a, 13b, and 13c is an illustrative module for the partial products logic for driving the Wallace tree circuitry.

At step 150, an RTL model of the carry look-ahead adder circuitry may be created. The carry look-ahead adder module has two carry look-ahead circuits (132 and 134 of FIG. 8) that add two associated output vectors from the Wallace tree. The RTL model of FIG. 14 is an illustrative RTL model of the carry look-ahead circuitry.

At step 152, an RTL model of the duplex multiplier is assembled from the RTL module for the partial products generation circuitry, the RTL module for the Wallace tree, and the RTL module for the carry look-ahead adder.

At step 154, synthesis tool 46 (FIG. 2) may be used to synthesize the RTL model of the duplex multiplier in the desired target technology (e.g., using standard cells) in accordance with user-supplied area and timing constraints.

At step 156, placement tool 58, physical optimization tool 62, and routing tool 66 may be used to complete the design of the duplex multiplier circuit in the target technology.

The netlists 50, 56, 60, 62, 64, and 68 (FIG. 2) that are produced during the design process may be verified against the RTL model 44 of the duplex multiplier that was produced at step 152.

Figure 16:
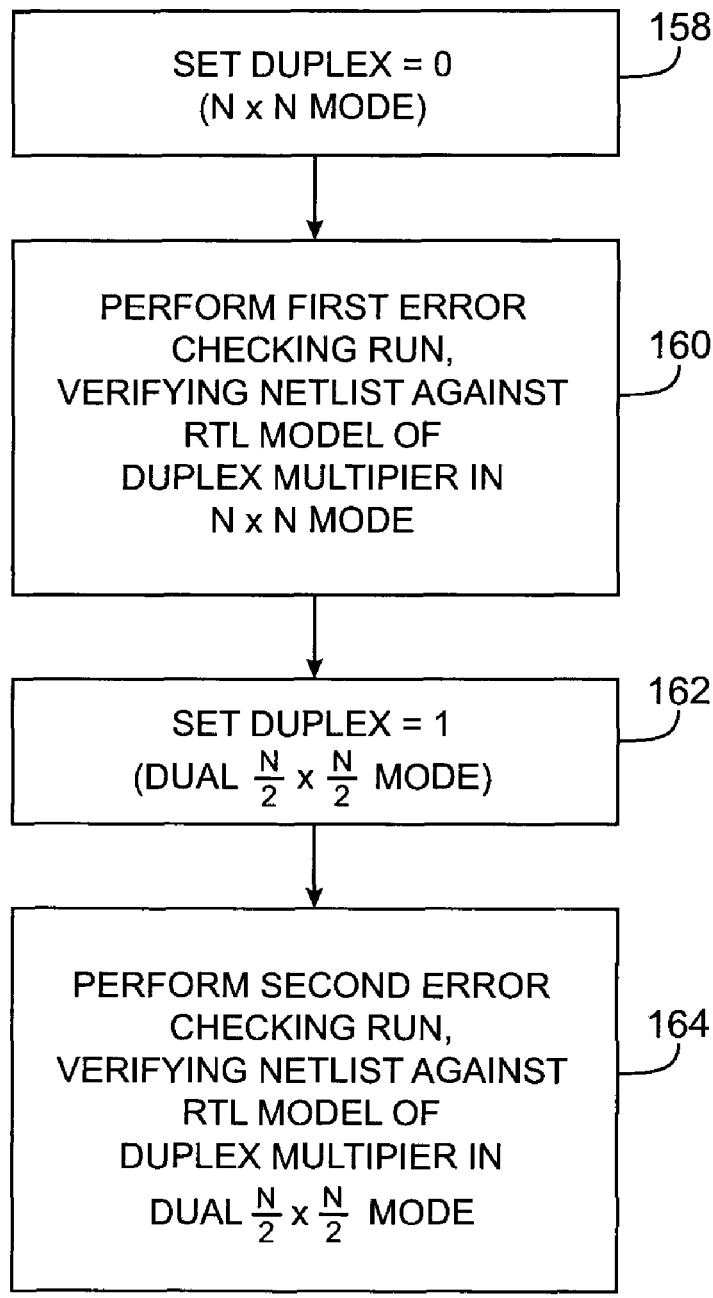
FIG. 16 is a flow chart of illustrative steps involved in exhaustively verifying (error checking) a duplex multiplier design in accordance with the present invention.

Illustrative steps involved in verifying the netlists against the RTL model are shown in FIG. 16. In general, any of these netlists may be checked against the RTL model 44 (FIG. 2), as shown by the lines 166 connecting the netlists to the RTL-to-gate LEC tool 76 in FIG. 2.

The process of FIG. 16 preferably involves two error-checking runs. After a user has selected a netlist to check for errors, the duplex variable DUPLEX is set to 0 (step 158) in the RTL model 44 of the duplex multiplier. A first error-checking run may then be performed against the selected netlist at step 160 using RTL-to-gate logic equivalency checking (LEC) tool 76 (FIG. 2).

The duplex variable DUPLEX may then be set to 1 (step 162) and, at step 164, a second error-checking run may be performed using RTL-to-gate logic equivalency checking (LEC) tool 76 of FIG. 2.

The process of FIG. 16 allows a conventional, commercially-available RTL-to-gate LEC tool to be used to exhaustively error check a duplex multiplier design against an RTL model. Two LEC runs are used to prove a netlist against the RTL model: one run with the "duplex" variable set to zero to verify the single 18-bit×18-bit multiplier configuration and another run with the "duplex" variable set to one to verify the duplex 9-bit×9-bit multiplier configuration.

The table of FIG. 17 shows run times that were obtained using a desktop computer and a commercially-available LEC tool 76 (Conformal LEC from Cadence). As shown in the table of FIG. 17, the 18-bit×18-bit configuration can generally be verified faster than the duplex 9-bit×9-bit configuration. This is due to the fact that when configured as a single 18-bit×18-bit multiplier, the logic appears as though it were an NBW 18-bit×18-bit multiplier. The commercially-available LEC tool 76 identifies this architecture and uses a specific solver that is computationally efficient for verification operations. In the duplex 9-bit×9-bit mode, the two parallel multipliers do not appear to the LEC tool 76 to be supported multipliers. However, the commercially-available LEC tool 76 can use general-purpose techniques such as binary decision diagrams for verification. Although binary decision diagrams are less computationally efficient than a dedicated solver, exhaustive verification is still possible due to the relatively modest size of the 9-bit×9-bit multipliers.

The area and performance of the duplex multiplier 92 have been benchmarked using a standard synthesis tool 46 and conventional standard cell technology library 54. To evaluate the overhead of adding a duplex mode on top of the NBW architecture, the duplex multiplier was compared to a basic signed 18-bit×18-bit NBW multiplier. Timing constraints ranging from 0.90 ns to 2.00 ns were set on both designs, and area and timing results provided by the standard synthesis tool were collected. Default operating conditions and default wire load models were used.

The 18-bit duplex multiplier was synthesized with two sets of timing constraints to evaluate performance for two different types of design scenarios (called "Duplex 1" and "Duplex 2"). Results are compared to the standard 18×18 NBW multiplier design in the graph of FIG. 18. The graph of FIG. 18 shows the area (chip real estate) versus delay time tradeoff for the standard NBW (non-duplex) multiplier (diamonds) and the two duplex multipliers—"Duplex 1" (squares) and "Duplex 2" (triangles).

With the first scenario (referred to as "Duplex 1" in FIG. 18), timing constraints were applied to the paths between the operand inputs and the outputs. The duplex signal was not constrained and was only buffered to meet technology rules. In this scenario, the duplex input is a slow signal that does not need to operate at the same frequency as the operand inputs. This scenario is applicable to integrated circuits such as programmable logic devices in which the state of the DUPLEX bit is set by the output of a configuration bit (e.g., a configuration RAM bit, a configuration bit associated with a programmable fuse, antifuse, or EEPROM cell, etc.).

With the second scenario (referred to as "Duplex 2" in FIG. 18), the same timing constraints were applied both to the paths between the operand inputs and outputs and to the path between the duplex input and the outputs. In this scenario, the duplex control signal operates at the same frequency as the operand inputs.

Figure 18:
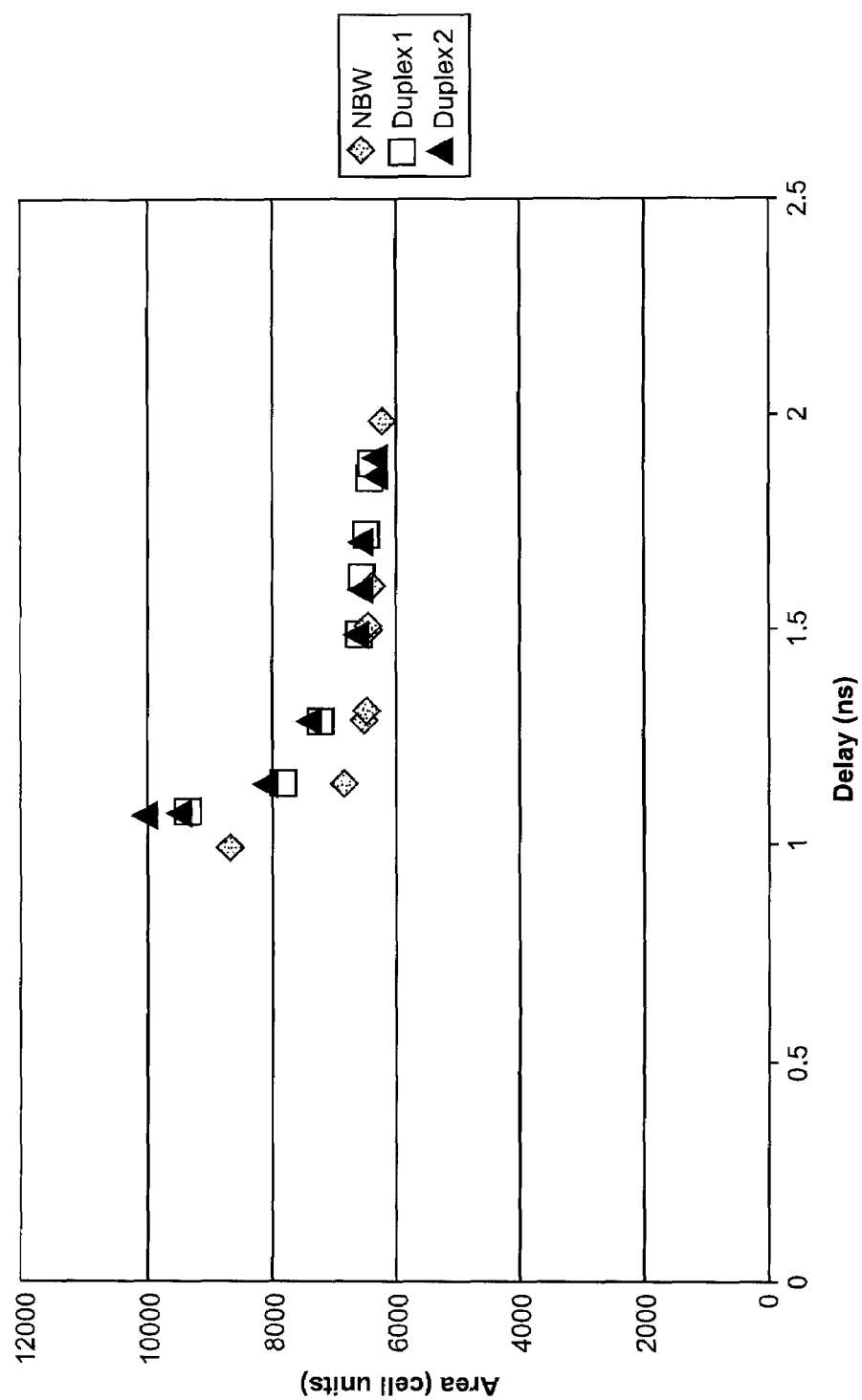
FIG. 18 is a graph that compares the performance of duplex multipliers in accordance with the present invention to a standard NBW N×N multiplier.

As shown in FIG. 18, both the Duplex 1 and Duplex 2 designs exhibit a relatively minor performance penalty when compared to a standard NBW N×N multiplier. The standard NBW (non-duplex) N×N multiplier produces somewhat lower delays than the duplex deigns for a given circuit area. This is expected, because the standard NBW multiplier does not need to function as dual N/2×N/2 multipliers. The Duplex 1 design, with its more relaxed timing constraints, is closer to the NBW design in performance than the Duplex 2 design, but both designs perform satisfactorily.

In the delay range of 1.5 ns to 2.0 ns (500 MHz to 660 MHz), the overhead of both the Duplex 1 and Duplex 2 implementations is less than 3%. In the delay range of 1.1 ns to 1.5 ns (900 MHz to 660 MHz), the overhead of Duplex 1 increases up to 7%, and the overhead of Duplex 2 increases up to 10%. As demonstrated by these small amounts of overhead, the duplex multiplier architecture is efficient from a performance and area perspective. As described above, the duplex multiplier can also be synthesized automatically using available tools 46 (FIG. 2), which reduces the possibility of errors that might otherwise be introduced by hand-coding a generic netlist. Available error checking tools such as RTL-to-gate LEC tool 76 may be used to exhaustively verify the various netlists produced during the design process against the RTL model 44 (FIG. 2).

The foregoing is merely illustrative of the principles of this invention and various modifications can be made by those skilled in the art without departing from the scope and spirit of the invention.

What is claimed is:

1. Duplex multiplier circuitry that is configurable to operate as either a single multiplier or at least two smaller multipliers, comprising:

partial product generation circuitry;

first and second circuits that receive partial product signals from the partial product generation circuitry;

carry look-ahead adder circuitry that receives carry and sum signals from the first and second circuits; and carry blocking circuitry connected between the first and second circuits that prevents carry signals from the first circuit from propagating to the second circuit when the duplex multiplier operates as two smaller multipliers, wherein the first and second circuits are Wallace tree circuits, wherein the Wallace tree circuits have a plurality of slices of circuitry, wherein each slice of circuitry corresponds to a different bit position, wherein at least one of the slices of circuitry comprises seven full adders, wherein the partial product generation circuitry produces a given signal at its output that is received by one of the slices of circuitry in the Wallace tree circuits, and wherein:

when the duplex multiplier operates as a single multiplier, the duplex multiplier operates as an N-bit by N-bit multiplier that produces a single product based on two N-bit input signals and the given signal does not contribute to the product; and when the duplex multiplier operates as the two smaller multipliers, the duplex multiplier operates as two N/2-bit by N/2-bit multipliers that produce corresponding first and second products and the given signal serves as a negative operand flag for one of the two N/2-bit by N/2-bit multipliers.

2. The duplex multiplier circuitry defined in claim 1 wherein the carry blocking circuitry has an input that receives a control signal, and wherein when the control signal has one value, the carry blocking circuitry prevents the carry signals from propagating from the first circuit to the second circuit and when the control signal has another value, the carry blocking circuitry allows the carry signals to propagate from the first circuit to the second circuit.

3. The duplex multiplier circuitry defined in claim 1 wherein the carry blocking circuitry is part of a Wallace tree circuit, and wherein the carry blocking circuitry and the carry look-ahead adder circuitry have control signal inputs to which a control signal is applied, wherein when the control signal has one value, the carry blocking circuitry blocks the carry signals and the carry look-ahead adder circuitry operates as two individual adders and wherein when the control signal has another value, the carry blocking circuitry allows the carry signals to propagate from the first circuit to the second circuit and the carry look-ahead adder circuitry operates as a single adder.

4. The duplex multiplier circuitry defined in claim 1 wherein the N-bit by N-bit multiplier is an 18-bit by 18-bit multiplier, wherein the N/2-bit by N/2-bit multipliers are 9-bit by 9-bit multipliers, wherein the plurality of slices of circuitry include an eighth slice corresponding to an eighth bit position, and wherein the eighth slice has an input that receives the given signal from the partial product generation circuitry.

5. The duplex multiplier circuitry defined in claim 4 wherein the eighth slice comprises seven full adders each having three inputs and wherein the input of the eighth slice that receives the given signal is one of the three inputs of one of the seven full adders in the eighth slice.

6. The duplex multiplier circuitry defined in claim 1 wherein the partial product generation circuitry, the first and second circuits, the carry look-ahead adder circuitry, and the carry blocking circuitry comprise standard cells.

7. Duplex multiplier circuitry that is configurable to operate as either a single multiplier or at least two smaller multipliers, comprising partial product generation circuitry that produces a signal, wherein:

when the duplex multiplier circuitry operates as the single multiplier, the duplex multiplier circuitry produces a single product based on two N-bit input signals, and when the duplex multiplier operates as the at least two smaller multipliers, the duplex multiplier circuitry produces corresponding first and second products and the signal serves as a negative operand flag for one of the at least two smaller multipliers.

8. The duplex multiplier circuitry defined in claim 7, further comprising:

first and second circuits that receive partial product signals from the partial product generation circuitry;

carry look-ahead adder circuitry that receives carry and sum signals from the first and second circuits; and carry blocking circuitry connected between the first and second circuits that prevents carry signals from the first circuit from propagating to the second circuit when the duplex multiplier operates as the at least two smaller multipliers.

9. The duplex multiplier circuitry defined in claim 8, wherein the first and second circuits have a plurality of slices of circuitry, wherein each slice of circuitry corresponds to a different bit position, and wherein at least one of the slices of circuitry comprises seven full adders.

10. The duplex multiplier circuitry defined in claim 9, wherein the signal is received by one of the slices of circuitry.

11. The duplex multiplier circuitry defined in claim 9 wherein the single multiplier comprises an 18-bit by 18-bit multiplier, wherein the at least two smaller multipliers comprise two 9-bit by 9-bit multipliers, wherein the plurality of slices of circuitry include an eighth slice corresponding to an eighth bit position, and wherein the eighth slice has an input that receives the signal.

12. The duplex multiplier circuitry defined in claim 11 wherein the eighth slice comprises seven full adders each having three inputs and wherein the input of the eighth slice that receives the signal is one of the three inputs of one of the seven full adders in the eighth slice.

13. The duplex multiplier circuitry defined in claim 8 wherein the first and second circuits comprise Wallace tree circuits.

14. The duplex multiplier circuitry defined in claim 7, wherein the single multiplier comprises an N-bit by N-bit multiplier.

15. The duplex multiplier circuitry defined in claim 7, wherein the signal does not contribute to the single product.

16. The duplex multiplier circuitry defined in claim 7, wherein the at least two smaller multipliers comprise two N/2-bit by N/2-bit multipliers.

* * * * *